(12) United States Patent
Oades

(10) Patent No.: US 7,121,532 B2
(45) Date of Patent: Oct. 17, 2006

(54) AERATION SYSTEM FOR LIQUID

(76) Inventor: Ross A. Oades, 310-41 Clayton Drive, Winnipeg, Manitoba (CA) R2M 1J3

( * ) Notice: Subject to any disclaimer, the term of this patent is extended or adjusted under 35 U.S.C. 154(b) by 42 days.

(21) Appl. No.: 10/999,141

(22) Filed: Nov. 30, 2004

(65) Prior Publication Data

US 2006/0103036 A1 May 18, 2006

Related U.S. Application Data

(60) Provisional application No. 60/626,935, filed on Nov. 12, 2004.

(51) Int. Cl.
*B01F 3/04* (2006.01)

(52) U.S. Cl. .............. 261/23.1; 261/30; 261/122.1; 261/123; 96/262; 96/353; 96/354; 96/356

(58) Field of Classification Search ............. 261/23.1, 261/30, 122.1, 123, 122.2, 124; 96/262, 96/343, 344, 345, 346, 350, 352–354, 356, 96/358
See application file for complete search history.

(56) References Cited

U.S. PATENT DOCUMENTS

| | | | | |
|---|---|---|---|---|
| 291,833 | A | * | 1/1884 | Bardo .......................... 261/124 |
| 1,834,646 | A | * | 12/1931 | Sandor ....................... 261/122.1 |
| 1,936,305 | A | * | 11/1933 | Leffler .......................... 261/123 |
| 3,116,347 | A | * | 12/1963 | Allen ............................ 261/26 |
| 3,711,072 | A | * | 1/1973 | Waldenville ............. 261/122.1 |
| 3,841,997 | A | * | 10/1974 | McGee ........................ 210/622 |
| 3,984,322 | A | * | 10/1976 | Peasley et al. ............... 210/197 |
| 4,005,014 | A | * | 1/1977 | Wikey ......................... 210/192 |
| 4,021,347 | A | | 5/1977 | Teller et al. |
| 4,096,065 | A | | 6/1978 | Bruch et al. |
| 4,139,471 | A | | 2/1979 | Foti |
| 4,181,614 | A | * | 1/1980 | Steenhorst ............... 210/221.2 |
| 4,288,394 | A | | 9/1981 | Ewing et al. |
| 4,564,447 | A | * | 1/1986 | Tiedemann .................. 210/220 |
| 4,869,852 | A | * | 9/1989 | Goudy et al. ............. 261/122.1 |
| 5,051,193 | A | | 9/1991 | Cummings, Jr. |
| 5,054,422 | A | * | 10/1991 | Nojima et al. ............... 119/215 |
| 6,224,041 | B1 | | 5/2001 | Rebori et al. |
| 6,554,996 | B1 | | 4/2003 | Rebori |
| 6,893,484 | B1 | * | 5/2005 | Thomas ....................... 95/226 |

FOREIGN PATENT DOCUMENTS

| CA | 2295064 | 9/1998 |
|---|---|---|
| JP | 11138191 | 5/1999 |

* cited by examiner

*Primary Examiner*—Scott Bushey
(74) *Attorney, Agent, or Firm*—Adrian D. Battison; Michael R. Williams; Ryan W. Dupuis

(57) ABSTRACT

An aeration tank used in a method of treating effluent includes a pipe for transporting the effluent from the source to the tank bottom and a discharge duct having a siphon effect for tapping off an overflow from the tank as more effluent is added from the source. An array of generally horizontal pipes is located in the tank having a series of exit holes along their length and connected to an air plenum at one side wall for feeding air into the end of each of the pipes, the pipes being arranged in columns one above another such that the air escapes from the pipes of the array through the holes to inject air into the effluent in the tank at positions spaced transversely, longitudinally and vertically. The pipes have flat upper discharge surfaces. Above each pipe is provided a collector channel which collects bubbles as they get too large and channels them to one end to be replaced by fresh small bubbles from a next above pipe.

9 Claims, 2 Drawing Sheets

AERATION SYSTEM FOR LIQUID

RELATED APPLICATION

This application claims domestic priority to provisional U.S. patent application 60/626,935, filed Nov. 12, 2004, now expired.

This invention relates to an aeration system for liquids including but not limited to water for treatment of water in the form of effluent or waste water where aeration for oxidation is required.

BACKGROUND OF THE INVENTION

Treatment of effluent for example sewage or waste from one or more homes requires careful attention to prevent ground contamination. Conventionally septic tanks are widely used in conjunction with a septic field. However these require extensive land use and thus can only be used in areas where sufficient land is available.

City sewage treatment plants are relatively expensive. Simple lagoons have become environmentally unacceptable.

Systems which utilize aeration of the effluent are disclosed in U.S. Pat. No. 6,224,041 (Rebori) issued May 1, 2001 and in U.S. Pat. No. 6,554,996 by the same inventor issued Apr. 29, 2003, both patents being assigned to Bio-Microbics Inc.

These systems utilize a primary tank for receiving the sewage material, an aeration tank in which the effluent is vigorously aerated and a storage tank prior to discharge of the treated material. Further details of this arrangement are shown in literature provided by the above company.

While these arrangements provide an effective treatment, the construction is relatively expensive utilizing a proprietary aeration system. Much of the remainder of the system is however well known and the disclosures of the above patents are incorporated herein by reference for information relating to the general field with which the present invention is concerned.

SUMMARY OF THE INVENTION

It is one object of the invention to provide an improved apparatus for aerating liquid.

According to one aspect of the invention there is provided an apparatus for aeration of liquid comprising:

a tank for receiving the liquid from a source having a tank bottom and tank sides for receiving and containing a quantity of the liquid during aeration;

a pipe for transporting the liquid from the source into the tank arranged to discharge the liquid adjacent the tank bottom;

a discharge duct for tapping off an overflow from the tank as more liquid is added from the source;

an array of pipes in the tank each extending across the tank from one side toward an opposite side and each having a series of exit holes along its length;

and an air feed system including an air pump for feeding air into one end of each of the pipes;

the pipes being arranged at different depths in the tank such that the air escapes from the pipes of the array through the holes to inject air into the liquid in the tank at positions spaced transversely, longitudinally and vertically.

Preferably there is provided above each pipe a collecting channel for collecting bubbles rising from the pipe, each collecting channel being arranged to direct the collected bubbles to one side of the tank to remove the collected bubbles from the main part of the tank.

Preferably the collecting channels are inclined upwardly toward said one side of the tank.

Preferably above each collecting channel is defined a further pipe for release of further bubbles.

Preferably each collecting channel forms an underside of a next adjacent pipe.

Alternatively each channel is separate from a next adjacent pipe.

Preferably each pipe has a generally flat upper surface spanning across a significant part of the width of the tank.

Preferably the pipes overlap in width and are staggered vertically to form a labyrinth path for the flow of the liquid from the bottom of the tank toward the top of the tank.

Preferably the pipes are parallel and coextensive.

Preferably the air feed system includes a plenum formed at the end of each of the pipes having an opening through one side wall into the plenum.

Preferably the discharge duct defines a liquid level and wherein the pipes have a top end below the liquid level.

Preferably the discharge duct includes a portion which extends downwardly within the tank from an apex with a bottom entry mouth and an exterior portion depending downwardly from the apex outside the tank so as to form a siphon effect at the mouth.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
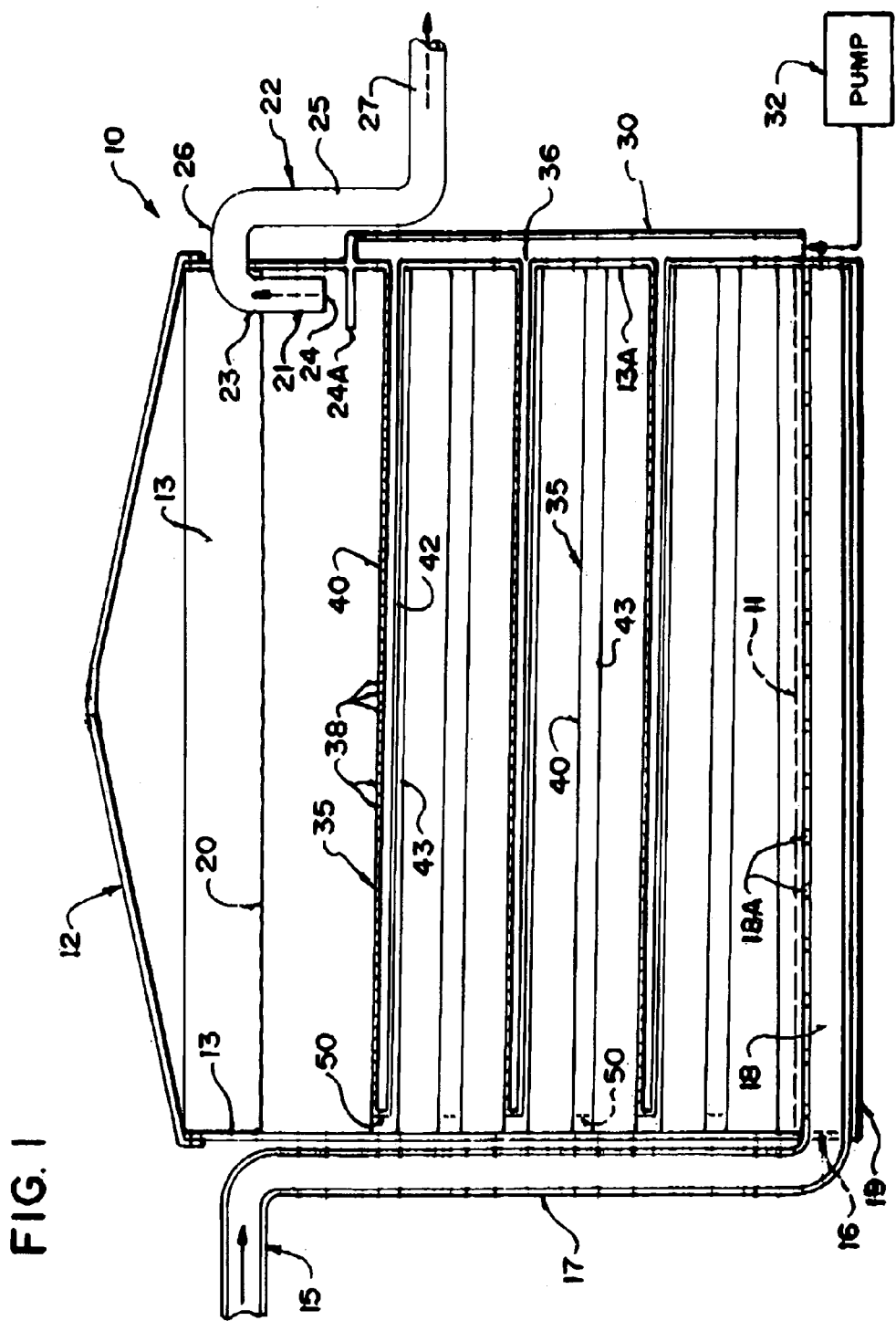
FIG. 1 is a longitudinal cross sectional view of an aeration tank according to the present invention.

In FIG. 1 is shown the aeration tank of a septic system which includes an initial septic tank receiving effluent from a source and which may include a third tank into which the effluent is transported downstream of the aeration tank of FIG. 1. These elements are not shown since they are well known to one skilled in the art. The effluent from the aeration tank can be transmitted directly to a field and in view of the aeration system which is used in addition to the conventional septic tank system, the septic field may be of reduced dimensions since the material fed to the field is of higher treated situation.

The tank shown in the figures comprises a basic tank structure generally indicated at 10 having a bottom wall 11 and upstanding sides 13 together with a top closure 12 which closes the sides 13 to form an enclosed tank. The tank shown is rectangular but of course it can be of other shapes as required. The material from which the tank is formed can be selected in accordance with conventional engineering practice but is preferably a plastics or fibre reinforced plastics material which is relatively light and simple to construct.

A supply pipe 15 receives effluent from the septic tank and transports this through an opening 16 in one wall of the tank with the pipe descending in a vertical portion 17 to a bottom portion 18 which extends across the bottom wall 11 of the tank. The opening 16 may be at the top of the tank and the portion 17 within the tank or may be at the bottom with the portion 17 outside the tank.

The bottom horizontal portion 18 has a series of holes in the upper face of the pipe so that the effluent carried by the pipe is discharged generally at the bottom of the tank at the wall 11 as a stream which is spread across the bottom of the tank and gradually moves upwardly within the tank to an upper liquid level 20 in the arrangement shown the portion 18 is contained in a channel 18A below the bottom of the tank but the portion may be above the bottom wall within the main body of the tank.

When the tank is filled to the level 20, the effluent discharges from the tank through an opening 21 which is controlled by a discharge pipe 22. Thus any additional liquid fed through the feed duct 15 causes overflow through the opening 21 and the pipe 22. The pipe 22 includes a first depending vertical portion 23 which extends downwardly to a bottom open mouth 24 into which the material enters, the mouth 24 is located below the level 20. The discharge pipe 22 further includes a depending portion 25 located outside the tank and below an apex 26 of the pipe. A bottom opening 27 of the pipe allows the liquid to be discharged to a suitable location depending upon the complexity of the system to be used.

Thus the discharge pipe 22 acts as a siphon to lower the level 20 to the mouth 24 so that air enters the mouth 24 which is facing downwardly when the level drops below the mouth thus ceasing the siphon effect and halting the discharge of liquid at the level of the mouth 24.

Along one side wall 13A of the tank is provided a plenum 30 which extends across substantially the full area of the wall 13A. Air from a pump 32 is pumped into the plenum 30 as a feed stream of aeration air.

The side wall 13 has a series of holes which co-operate with an array of generally horizontal pipes 35 located within the tank. Each pipe has one end 36 located at a hole in the wall 13 so that air from the plenum 30 enters the pipe and passes along the pipe under pressure from the pump 32. Each pipe has a closed opposite end so that the air is contained within the pipe and each pipe has a plurality of discharge holes 38 at positions along the pipe.

Figure 2:
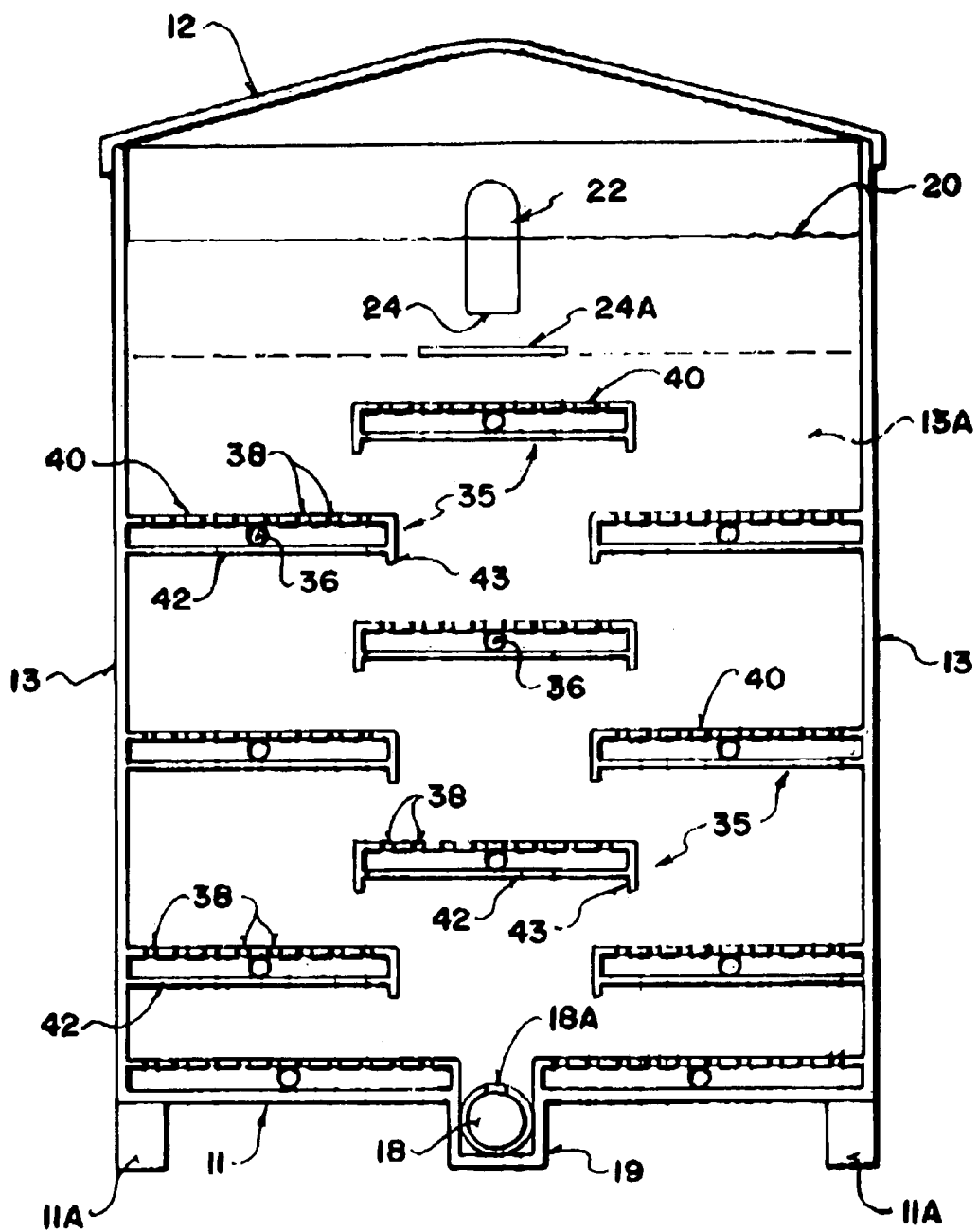
FIG. 2 is a transverse cross sectional view of the tank of FIG. 1.

The pipes are arranged in an array as shown in FIG. 2 so that the pipes are arranged at positions spaced transversely of the tank.

As shown in FIG. 2, the pipes of the array may be staggered.

It will however be appreciated that the arrangement of the holes in angularly and axially spaced positions of the pipe together with the transverse and longitudinally spaced array of the pipes ensures that air is injected from the plenum into the liquid within the tank at locations within the tank that are spaced both longitudinally, transversely and also vertically.

The pipes are preferably manufactured of a plastics material which is resistant to corrosion. The pipes are located within the tank below the level of the liquid.

The pipes 35 as shown best in FIG. 2 are not cylindrical in shape but instead are generally rectangular in cross section to define a wider upper surface 40 which contains the discharge holes 38 in an array longitudinally and transversely of the upper surface 40. The pipes are arranged in columns so that in the example shown there are three such columns with three or four pipes in each column one above the next. In the example shown two of the pipes are arranged at the bottom wall 11 so that the bottom surface of that pipe is formed by the bottom wall 11. Each of the pipes is arranged on opposite sides of the channel 18A in the bottom wall so that the bottom pipes substantially cover the bottom wall with the exception of the channel 18A and the area for the discharge of the liquid from the pipe 18.

The pipes are arranged with the discharge holes 38 so that the injection of air into the pipes is sufficient to cause air to escape through each of the holes 38 across the full extent of the upper surface of the pipe. The holes are small so that only small bubbles of air escape from the upper surface of the pipes with those bubbles rising upwardly within the liquid in the tank.

Above each pipe is located the next adjacent pipe which has a bottom wall 42 substantially coextensive with the top wall 40. The bottom wall 42 thus forms a barrier across the tank for the bubbles rising in the tank so that when the bubbles reach the surface of the bottom wall 42 of the next pipe, the bubbles accumulate against that bottom wall and collect to form a larger bubble of air sitting against the bottom surface of the wall 42.

The wall 42 is arranged to form a channel so that the collecting bubbles which conjoin to form an air collection are contained under the wall 42 and prevented from escaping to the sides of the wall 42. In the arrangement shown for this purpose there is provided a lip or flange 43 at the edge of the bottom wall 42 thus forming a channel underneath the pipe.

In regard to the column of pipes adjacent each of the side walls of the tank, the pipes butt the side walls so that there is no necessity for a flange 43 at the side wall. However the outer exposed edge of the pipe in the column of pipes adjacent the side wall has such a flange 43. The central column of pipes has a flange at each end so that the air is prevented from escaping at the sides of the pipe.

As shown in FIG. 1, each of the pipes is inclined slightly upwardly so that the opposite end from the hole 36 at a elevated position relative to the hole 36. Also the opposite end indicated at 50 of the pipe is spaced slightly from the end wall of the tank so as to leave an open area. Thus the collecting bubbles underneath the pipe tend to run toward the opposite end 50 where they can be discharged along the end wall of the tank and rise as a stream of air.

The purpose of this arrangement is that the bubbles when they are formed as the air exits the discharge openings 38 are small bubbles in large numbers thus providing the maximum surface area for the volume of air involved. However as the bubbles rise in the liquid they tend to expand due to the reduction in pressure and also the bubbles conjoin with next adjacent bubbles so that the bubbles rapidly become significantly increased in volume so that the total surface area decreases. In order therefore to maintain the bubbles at the very small sizes, larger bubbles are transported out of the stream by collecting underneath the collecting wall defined by the bottom of the pipe and are carried to one end of the tank where they can leave the tank without interfering with other small bubbles which are being formed from the next adjacent pipe.

Thus each pipe in turn generates small bubbles and as those bubbles increase in size they are channelled off to one end of the tank to be replaced by additional small bubbles from the next pipe.

It will be noted from FIG. 2 that the central column of pipes is staggered relative to the end columns so that the liquid can transfer gradually from the bottom of the tank to the top of the tank by moving between the pipes in a labyrinth flow.

In an alternative arrangement including pipes and collectors the collectors are formed as separate elements distinct from the individual pipes thus requiring additional material. In addition the pipe are of cylindrical shape so that increased numbers of pipes are required to provide an array covering the full area of the tank. Thus each pipe in an array of the pipes has associated with it a collector located above the pipe which operates in the manner described above to collect the bubbles after the bubbles have risen through a distant sufficient so that they become less efficient. Again the collectors are inclined upwardly so that there is a free open end of the collectors where the collected air from the conjoined bubbles escapes at the end wall of the tank and rises within the tank as a stream of air without interfering with the small bubbles released from the individual pipes.

In a further alternative arrangement, rectangular or generally flat pipes can be used of the type shown in FIGS. 1 and 2 with separate collectors of the type mentioned above. In the above modified arrangement the collectors are generally of an inverted V-shape to form a channel and it will be appreciated that such a channel which collects the air from the bubbles rising upwardly from a pipe can be formed with depending sides or in V-shape or in other shapes provided that the air is collected and channel to one end.

The number of pipes, the number of pipes in the columns and the length and width of the pipes can be varied to provide a required level of aeration within a body of liquid depending on its content. The system can be used for treatment of various sources of water at different levels of contaminants and can be used with other purifications systems such as UV light and chlorination.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. Apparatus for aeration of liquid comprising:
a tank for receiving the liquid from a source having a tank bottom and tank sides for receiving and containing a quantity of the liquid during aeration;
a liquid supply pipe for transporting the liquid from the source into the tank arranged to discharge the liquid adjacent the tank bottom;
a discharge duct for removing liquid from a top of the tank to maintain a desired level of the liquid in the tank as more liquid is added from the source;
an array of aeration pipes in the tank above the bottom and below the level of the liquid so that the aeration pipes are located in the liquid in the tank;
each aeration pipe having an upper discharge surface with an array of air exit holes at spaced positions along its length and at spaced positions across its width;
an air feed system including an air pump for feeding air into one end of each of the pipes for discharge of the air through the air exit holes into the liquid as bubbles of the air in the liquid;
the array of aeration pipes being arranged such that each of the aeration pipes extends at least partly across the tank in a first direction of the tank;
the array of aeration pipes being arranged such that the aeration pipes are arranged at spaced positions across the tank in a second direction of the tank transverse to the first direction;
the array of aeration pipes being arranged such that the aeration pipes are arranged at different depths in the tank so as to define lower ones of the aeration pipes in the tank and upper ones of the aeration pipes in the tank at a death in the liquid higher than the lower ones of the aeration pipes;
such that liquid flows between and over the aeration pipes in a path from the supply pipe to the discharge duct;
and such that the air escapes from the aeration pipes of the array through the holes to inject air into the liquid in the tank at positions spaced in the tank both in the first and second directions and spaced vertically in the tank;
and a plurality of collecting channels each located in the tank above a respective one of the lower ones of the aeration pipes;
each of the collecting channels being arranged to collect bubbles rising from the respective one of the aeration pipes and being inclined so as to transport the bubbles as a stream of air to a location in the tank separated from the path of the liquid;
at least some of the upper ones of the aeration pipes being located in the tank above respective ones of the collecting channels so as to discharge the air from the upper ones of the aeration pipes through the air exit holes as bubbles into the liquid from which the bubbles of the lower ones of the aeration pipes have been removed by the collecting channels.

2. The apparatus according to claim 1 wherein the collecting channels are inclined upwardly toward said location at one side of the tank.

3. The apparatus according to claim 1 wherein each collecting channel is defined by an underside of a respective one of the upper ones of the aeration pipes.

4. The apparatus according to claim 1 wherein each aeration pipe has a generally flat upper surface spanning across a part of the width of the tank.

5. The apparatus according to claim 4 wherein the aeration pipes overlap in width and are staggered vertically to form a labyrinth path for the flow of the liquid from the bottom of the tank toward the top of the tank.

6. The apparatus according to claim 1 wherein the aeration pipes are parallel and coextensive.

7. The apparatus according to claim 1 wherein the air feed system includes a plenum formed at the end of each of the aeration pipes having an opening through one side wall into the plenum.

8. The apparatus according to claim 1 wherein the discharge duct defines a liquid level and wherein the aeration pipes have a top end below the liquid level.

9. The apparatus according to claim 1 wherein the discharge duct includes a portion which extends downwardly within the tank from an apex with a bottom entry mouth and an exterior portion depending downwardly from the apex outside the tank so as to form a siphon effect at the mouth.

* * * * *